United States Patent [19]

Megarry

[11] Patent Number: 4,882,118
[45] Date of Patent: Nov. 21, 1989

[54] METHOD AND APPARATUS FOR MOLDING FIBER REINFORCED RESIN MATRIX COMPOSITE MATERIAL

[75] Inventor: Thomas J. Megarry, Holywood, United Kingdom

[73] Assignee: Short Brothers PLC, Belfast, England

[21] Appl. No.: 127,564

[22] Filed: Dec. 1, 1987

Related U.S. Application Data

[63] Continuation of Ser. No. 841,566, Mar. 20, 1986, abandoned.

[30] Foreign Application Priority Data

Apr. 1, 1985 [GB] United Kingdom ................ 8508419

[51] Int. Cl.[4] ............................................. B29C 51/10
[52] U.S. Cl. ...................................... 264/510; 249/82; 249/155; 249/158; 249/165; 264/258; 264/571; 425/389; 425/405.1
[58] Field of Search ................ 264/1.7, 1.9, 101, 136, 264/137, 236, 257, 258, 309, DIG. 53, 511, 510; 249/82, 155, 158, 159, 165; 425/389, 403, 405.1, 446, 470

[56] References Cited

U.S. PATENT DOCUMENTS

| | | | |
|---|---|---|---|
| 1,092,195 | 4/1914 | Workman | 249/156 |
| 1,444,179 | 2/1923 | Fiala | 249/158 |
| 2,674,888 | 4/1954 | Simonet | 249/158 |
| 3,146,148 | 8/1964 | Mitchella et al. | 264/511 |
| 4,102,964 | 7/1978 | Ridgeway | 264/511 |

FOREIGN PATENT DOCUMENTS

| | | | |
|---|---|---|---|
| 7708234 | 7/1976 | Netherlands | 249/82 |
| 388827 | 5/1971 | U.S.S.R. | 249/155 |
| 572198 | 9/1945 | United Kingdom . | |
| 762462 | 11/1956 | United Kingdom . | |
| 879769 | 10/1961 | United Kingdom . | |
| 2073648 | 10/1981 | United Kingdom . | |

*Primary Examiner*—James Lowe
*Attorney, Agent, or Firm*—Kenyon & Kenyon

[57] ABSTRACT

Moldings (41) of fibre/resin matrix composite material are vacuum bag molded "net-to-size" by providing periphery elements (20–22) on the molding face (11) of the tooling (10) and allowing them to slide on the molding face during curing of the molding. Buttstrap edges (FIG. 3) can be provided in this way, on the molding, as an integral part of the molding process.

15 Claims, 1 Drawing Sheet

METHOD AND APPARATUS FOR MOLDING FIBER REINFORCED RESIN MATRIX COMPOSITE MATERIAL

This application is a continuation of application Ser. No. 841,566 filed Nov. 20, 1986 now abandoned.

BACKGROUND OF THE INVENTION

1. Field of the Invention

This invention relates to a method of making a sheet-form article from fibre-reinforced resin matrix composite material comprising the steps of arranging the fibres and uncured resin in tooling which defines a more or less flat moulding face corresponding to the shape which it is desired that a face of the article should assume, covering the fibres and resin with a gas-tight membrane, reducing the gas pressure around the fibres and resin between the tooling and the membrane, and curing the resin at elevated temperature.

2. Description of Related Art

Conventionally such articles are moulded over-size in the aforementioned tooling, the moulded articles being edge-trimmed to size subsequent to the moulding stage.

It has always been considered that the difficulties of allowing for thermal expansion exclude any possibility of moulding "net-to-size". There has, in addition, been a feeling that the mechanical properties of the moulded composite material may be relatively poor around the edge of the moulding, compared with the bulk properties away from the edge of the moulding. Trimming subsequent to moulding cuts away this suspect material.

The trimming of mouldings after they have been cured is, however, an expensive process and can introduce unwelcome delamination on the trimmed edge. It is usually necessary to coat the trimmed edge, and this represents another unwelcome expense.

SUMMARY OF THE INVENTION

It is one object of the present invention to avoid or ameliorate the above-mentioned disadvantages of the conventional moulding method.

According to a first aspect of the present invention there is provided a method of making a sheet-form article as above, as a stage in the manufacture of a finished article which has an edge surface of a specified profile, characterised by the step of providing on the moulding face of the tooling at least two periphery elements of specified edge profile to define a mould cavity periphery of the desired shape and size, whereby the periphery elements serve both to contain the reinforcing fibres of the article and establish the finished size of the article, and also to establish during the moulding step, by virtue of the said edge profile, the said edge surface of the moulded article and the specified profile thereon, at least one of the periphery elements being carried on the moulding face in such a way that it can slide on the moulding face during the curing step.

In the method of the invention the coefficient of thermal expansion of the material of construction of the tooling should be as close as possible to that of the resin from which the moulded article is formed. For the resins used in moulding carbon-fibre reinforced plastics (CFRP) aerostructural components, steel tooling has been found suitable in this respect, and has the additional advantage that it is relatively easy to fabricate. Nevertheless, it will normally be necessary, as explained below, to allow for thermal expansion and contraction by permitting some at least of the mould periphery elements to slide on the moulding face of the tooling, during the moulding operation.

According to a second aspect of the invention there is provided tooling in which to mould, and cure at elevated temperature, a sheet-form article made from fibre-reinforced resin matrix composite material, which tooling includes at least one mould periphery element mounted on the moulding face of the tooling, to define part of the periphery of a mould cavity, in such a way that it can slide on the moulding face during the curing step.

It is convenient to refer hereinafter to the mould periphery elements attached to the mould face as "periphery bars" or "periphery plates".

In accordance with the invention, the periphery of a mould cavity of the desired shape can be delineated exclusively by two or more periphery bars or plates, or by a combination of one or more of the periphery bars or plates together with periphery surfaces integral with the mould face. In either case, the tooling is such as to define the physical size of the article, to prevent bleeding of resin out of the mould cavity, and produce a moulded article with an edge section precisely as required in the finished article, maintaining exact size repeatability through subsequent components, with a full complement of the reinforcing fibres extending all the way up to the edges of the moulded article, but at the edges covered by the resin matrix and not exposed as at a trimmed oversize edge.

As a direct result of the capability of curing a composite component net-to-size, there is the additional important benefit of the ability to cure certain component edge sections not previously possible with the 'oversize' approach. One example is a "buttstrap" edge i.e. a built in edge coaming. Thus, an integrally cured access panel landing can be provided, in which the landing, that is, the support edge for the entire periphery of an access panel, is of the integral buttstrap type.

Periphery bars and plates are as a rule made from the same material as the tooling "skin" which defines the moulding face. They can be secured against movement across the tool skin by locating elements, for example, studs, pins or pads welded to, or threadably engaged with, the tool skin. In a case where the periphery element is required to slide on the moulding face during curing, the locating elements which are holding it can be removed prior to cure. Alternatively, provision can be made for limited sliding movement, during the cure, between the periphery element and its locating elements.

DETAILED DESCRIPTION OF THE PREFERRED EMBODIMENT

Figure 1:
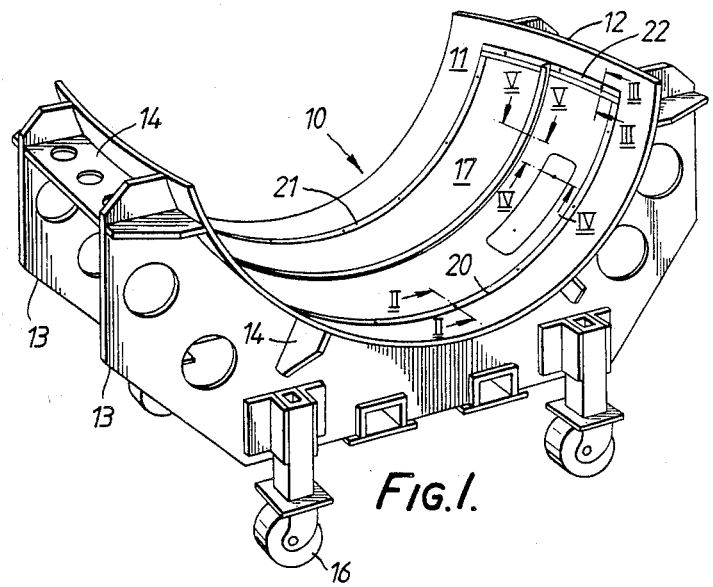
FIG. 1 is a perspective view of steel tooling on which may be moulded a double-curvature sheet-form article which is to form part of the circumference of a larger generally cylindrical article.

The tooling 10 shown in FIG. 1 is based on a moulding face surface 11 formed from a large steel sheet 12, backed by circumferential 13 and transverse 14 backing members to maintain the desired shape of the moulding face surface 11. Caster wheels 16 are provided for mobility.

Figure 2:
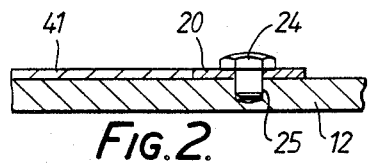
FIGS. 2 to 5 are scrap sections taken from FIG. 1 along the correspondingly numbered section lines indicated thereon.
Figure 3:
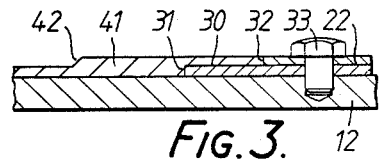

On the mould surface 11 there are provided four elements to define the size and edge profile of a mould cavity 17 approximately 2m in length and 1m in width. Only three of the elements (elements 20, 21, and 22) can be seen in FIG. 1. FIG. 2 shows how the element 20 is fixed to the sheet 12 by a plurality of threaded studs 24 which engage with a corresponding thread in blind bores 25 in the sheet 12. The element 21 on the opposite side of the mould cavity 17 is similarly fixed to the sheet 12. As for the element 22, FIG. 3 shows that it has a stepped edge profile consisting of a step 30 linking an inside edge 31 and an outside edge 32. It is held to the sheet 12 by studs 33 in the same way as the elements 20 and 21. The opposite edge (not visible) of the mould cavity 17 is defined by the fourth element, which has the simple edge profile of elements 20 and 21.

Figure 4:
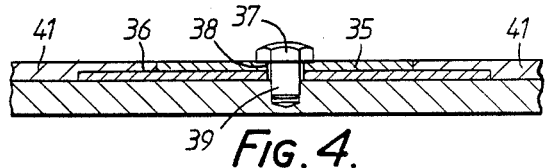

FIG. 4 shows a further periphery element 35 which has the dimensions of an inspection hatch or access opening which is to be provided in the moulded article. It has a periphery 36 which exhibits a stepped edge similar to that of the edge element 22. The element 35 is held to the sheet 12 by two studs 37 in apertures 38 in the element 35 and blind threaded bores 39 in the sheet 12, as explained above. The apertures can, if desired, be made oversize as shown, in which case the studs 37 can be left in place during the curing step.

In use of the tooling the mould cavity 17 is filled progressively with layers 40 of carbon fibre material which are conveniently already resin-impregnated and in the so-called "pre-preg" form.

Figure 6:
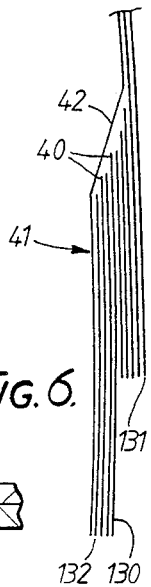
FIG. 6 is a section showing schematically lay up of fibres in the composite material to be moulded.

FIG. 6 shows in schematic form an arrangement of individual pre-preg layers 40 at a location such as along the stepped edge of the element 22 as shown in FIG. 3. The step 30 on the periphery bar 22 defines a flat lip 130 in the cured composite article 41 extending between an outer edge 132 of the article and an inner edge 131. Such an edge is called an "integral buttstrap" edge. As shown in FIGS. 3 and 6, an increased number of pre-preg layers 40 at the edge generates a shoulder 42 in the cured article. The layers can conveniently be trimmed to size, before placement in the mould cavity by use of a template, or after placement by running a scalpel along the inside edge of the periphery surfaces of the mould cavity, that is to say, by using the periphery elements as a template.

Figure 5:
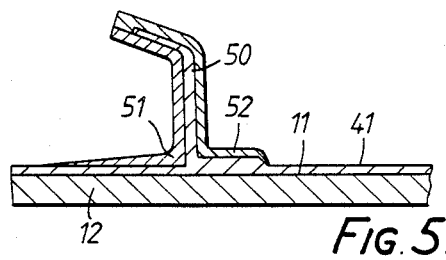

The form of the article to be moulded can include features of shape not determined exclusively by the mould surface 11 and the periphery elements 20 to 33. FIG. 5, for example, shows how a strengthening stiffener flange 50 can be incorporated in the article 41 by laying pre-preg layers under and around a lower former 51 and then bringing an upper former 52 into mating relationship with the lower former 51 for moulding of the pre-preg layers between the two formers 51 and 52 and between each former and the mould surface 11 of the tooling 12.

After trimming and laying up of the pre-preg layers in the mould cavity, the studs 24, 33 and 37 are removed so that all the periphery elements can slide over the surface 11 in response to any stresses induced by thermal expansion or contraction during the subsequent curing step. A gas-tight membrane, that is, a so-called "vacuum bag", is laid over the tool skin. The space beneath the membrane is evacuated, to achieve across the membrane a pressure differential calculated to press the layers of fibre material firmly down into the mould cavity.

Provided that the periphery bars are matched carefully to the tool surface, there should be no substantial loss of resin from the mould cavity past the bars, although some insignificant leakage, with consequent formation of "flash" may occur.

After this compaction step, the resin is cured under vacuum by placing the tooling 10 in an autoclave and bringing it up to resin curing temperature. The cured article is of the required size and has a sharply defined edge of precisely the required section.

As appropriate, use can be made of location pads, welded to the tool skin 12, to abut the surfaces of the periphery elements which face outwards from the mould cavity 17, and define the orientation of the elements on the tool skin 12, relative to the mould cavity 17. Welded studs and pads are appropriate for tool sheets 12 up to 9 mm thick. For sheets thicker than this, use can be made, as shown in FIGS. 2, 3 and 4, of location screws and pins extending through apertures in periphery elements, to engage threadably with blind bores in the sheet. If the bores are not blind, vacuum integrity will be lost and there is a danger of escape of resin downwardly through the bores.

Figure 7:
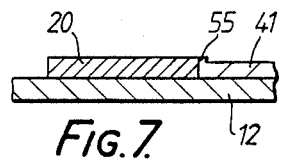
FIGS. 7 and 8 are further sections similar to those of FIGS. 2 to 5.
Figure 8:
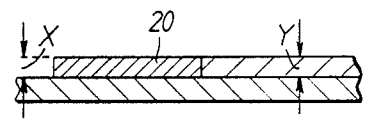

The thickness of the bars (perpendicular to the moulding surface 12), along their inside edge at the periphery of the mould cavity 17, should be no greater than the desired thickness of the moulded component at its periphery. Otherwise, as shown in FIG. 7, there can occur an undesirable upwardly projecting lip 55 on the periphery of the moulded article 41. The optimum arrangement is shown in FIG. 8 where the thickness X of the constant thickness periphery bar 20 is exactly the same as the thickness Y of the moulded article 41, and there is no resin lip corresponding to the lip 55 of FIG. 7.

If the desired final thickness of the edge of the moulded article is smaller than will provide a periphery bar with sufficient physical strength during its expected life, the bar can be chamfered down, over a distance of about 10–15 mm, from the thickness necessary for its sufficient physical strength to a reduced thickness at the inwardly facing edge of the periphery bar, where its thickness must be no greater than the required thickness of the edge of the moulded article.

The width of the periphery bar is arbitrary and may change with application, but experience suggests that the optimum width of the periphery bars in the plane of the tool surface 12 is about 32mm, and that the centres of any fixing studs and screws which extend through the bars should be closer to the outside edge of the bars than to the edge which defines the periphery of the mould cavity. Most preferably, the line should be about 22 mm from the mould cavity periphery.

When designing moulds for large components, care must be taken to allow for the difference in the co-efficient of thermal expansion of the tooling and the composite material of the article being moulded. Both the tool skin and the uncured composite are raised from ambient temperature to the curing temperature which is typically 177° C. As a result, the composite is cured at a size larger than defined by the periphery bars at ambient temperature, and so the dimensions of the mould cavity at ambient temperature must be adjusted to compensate for this expansion. Carbon fibre resin composite (CFRP) articles do not contract, during their fall in temperature from autoclave curing temperature to room temperature, as much as might be indicated by the thermal expansion coefficient of the resin system used. Damage to the moulded article by the build-up of contraction stresses in periphery bars during cooling to ambient temperature can be avoided by removing prior to cure the locating pins of at least one set of opposing periphery bars. This allows the freed bars to "float", that is, to slide across the surface of the tooling as they remain in contact with the edge of the moulded article. Alternatively, the bars are held to the tool surface 12 by fixing means which allow limited sliding movement of the bars over the surface 12.

It will often be the case, in practice, that the optimum choice of tooling for any small shaped article will lie with a combination of peripheral surfaces integral with a mould skin, and periphery bars which can slide over the tool surface 12.

I claim:

1. A method of making a sheetform article from fibre-reinforced resin matrix composite material including the steps of arranging layers of fibres impregnated with uncured resin in tooling which defines a more or less flat molding face corresponding to the shape which it is desired that a face of the article should assume, covering the fibres and resin with a gas-tight membrane, reducing the gas pressure around the fibres and resin between the tooling and the membrane, heating the tooling and the composite material to a temperature high enough to cure the resin, and cooling the cured article and the tooling to ambient temperature, wherein the method is a stage in the manufacture of a finished article which has an edge surface of a specified profile, and wherein the improvement comprises the steps of securing on the molding face of the tooling, prior to arranging the layers of resin-impregnated fibres, at least two periphery elements having a preselected edge profile corresponding to said specified edge profile to define a mold cavity periphery of a shape and size that is predetermined to establish an expanded desired finished shape and size of the article after curing, and also to establish during the molding step, by virtue of said edge surface profile of each mold periphery element, the said edge surface of the molded article and the specified profile thereon, the step of arranging the layers of fibres includes placing layers of fibres impregnated with resin closely abutting the edge surfaces of the periphery elements, and after arranging the layers of resin-impregnated fibres, allowing at least one of the periphery elements to slide on the molding face during the heating and cooling steps in response to differential thermal expansion and contraction between the layers of resin impregnated fibres and the molding face of the tooling without exerting significant compressive force on the edges of the sheet-form article.

2. A method as claimed in claim 1 wherein the fibres are of carbon and the tooling is of steel.

3. A method as claimed in claim 1 wherein the step of securing the periphery elements on the moulding face comprises forming at least one of the mould periphery elements integrally with the moulding face.

4. A method as claimed in claim 1 wherein the specified profile of the finished article includes a buttstrap edge.

5. A method as claimed in claim 1 wherein the step of arranging the layers of resin-impregnated fibres comprises trimming to size the layers arranged in the tooling by using the periphery elements as a template.

6. A method as claimed in claim 1 wherein the step of securing the periphery elements comprises fixing the periphery elements against movement across the moulding face by locating elements which are fixed to, and protrude from, the skin of the tooling.

7. A method as claimed in claim 6 wherein the step of fixing the periphery elements comprises fastening studs into the moulding face through apertures in the periphery elements so as to clamp the periphery elements against the moulding face.

8. A method as claimed in claim 7 wherein the said apertures are over-size, and the step of allowing at least one of the periphery elements to slide comprises loosening the studs to allow at least limited lateral sliding movement of the periphery elements defining the apertures over the moulding face during the heating and cooling steps.

9. A method as claimed in claim 7 wherein the step of loosening the studs comprises removing the said studs prior to the step of heating to curing temperature of the resin.

10. Tooling apparatus for molding and heat-curing a sheet-form article laid up from individual layers of fibre-reinforced resin matrix composite material, the tooling comprising:

a base member having a molding face corresponding to a desired shape of a face of the finished article;

at least one mold periphery element having a first surface for sealingly engaging the surface of the molding face at a predetermined location on the molding face and an edge surface extending transversely to the first surface, the edge surface having a shape and a cross-sectional profile corresponding to a desired shape and profile of an edge portion of the finished article; and means for securing the mold periphery element to the base member at said predetermined location with the first surface of the periphery element in substantially sealing engagement with the molding face, such that the edge surface of the mold periphery element defines a portion of a continuous periphery of a mold cavity surrounding the molding face of said base member, said securing means comprising means for selectively clamping the mold periphery element sufficiently firmly against the base member to maintain the element at said location during laying up of a composite material in said mould cavity and thereafter sufficiently loosely to allow the element to slide on the molding face after the article has been molded, in response to differential thermal expansion and contraction between the composite material and the base member during heating thereof to at least 177° C. to cure the resin in the composite material and during subsequent cooling to ambient temperature, without exerting significant compressive force on the edge portion of the molded article.

11. Tooling apparatus according to claim 10 wherein the periphery element has a through aperture extending transversely to said first surface, and said securing means comprises a locating stud protruding from the moulding face of the base member through said aperture and said clamping means comprises means on said locating stud for pressing the periphery element against the moulding face.

12. Tooling apparatus according to claim 11 wherein said locating stud is removable from the base member so as to remove the pressing means and permit free sliding movement of the periphery element on the moulding face.

13. Tooling apparatus according to claim 11 wherein the aperture provides a clearance around the stud, and the pressing means is adjustable to allow limited sliding of the periphery element relative to the moulding face for accommodating said relative thermal expansion and contraction between the composite material and the base member during and subsequent to high temperature curing of the resin in the composite material.

14. Tooling apparatus according to claim 10 wherein the cross-sectional profile of said mould periphery element is stepped so as to form a buttstrap edge portion on the sheetform article.

15. Tooling apparatus according to claim 10 wherein said periphery element comprises a form member for an access opening to be provided in the moulded sheetform article, and said cross-sectional profile of the periphery element is stepped so as to form an integral buttstrap landing for a closure panel for said access opening during the process of moulding the sheet-form article.

* * * * *

UNITED STATES PATENT AND TRADEMARK OFFICE
CERTIFICATE OF CORRECTION

PATENT NO. : 4,882,118

DATED : November 21, 1989

INVENTOR(S) : Megarry

It is certified that error appears in the above-identified patent and that said Letters Patent is hereby corrected as shown below:

Column 1, line 7: Change "Nov. 20," to --Mar. 20,--.

Column 4, line 62: Change "co-effi-cient" to --coeffi-cient--.

Column 4, line 24: Change "9" to --9--.

Signed and Sealed this

Fifteenth Day of January, 1991

Attest:

HARRY F. MANBECK, JR.

*Attesting Officer*          *Commissioner of Patents and Trademarks*